(12) United States Patent
Ding et al.

(10) Patent No.: US 11,397,158 B2
(45) Date of Patent: Jul. 26, 2022

(54) RECONFIGURABLE LASER STIMULATED LOCK-IN THERMOGRAPHY FOR MICRO-CRACK DETECTION

(71) Applicant: AGENCY FOR SCIENCE, TECHNOLOGY AND RESEARCH, Singapore (SG)

(72) Inventors: Lu Ding, Singapore (SG); Jinghua Teng, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 243 days.

(21) Appl. No.: 16/498,814

(22) PCT Filed: Mar. 29, 2018

(86) PCT No.: PCT/SG2018/050159
§ 371 (c)(1),
(2) Date: Sep. 27, 2019

(87) PCT Pub. No.: WO2018/182530
PCT Pub. Date: Oct. 4, 2018

(65) Prior Publication Data
US 2020/0041432 A1 Feb. 6, 2020

(30) Foreign Application Priority Data
Mar. 29, 2017 (SG) .............................. 10201702564S

(51) Int. Cl.
*G01N 25/72* (2006.01)
*G01N 21/84* (2006.01)
(Continued)

(52) U.S. Cl.
CPC ............. *G01N 25/72* (2013.01); *G01N 21/63* (2013.01); *G01N 21/71* (2013.01); *G01N 21/84* (2013.01);
(Continued)

(58) Field of Classification Search
CPC ........ G01N 21/84; G01N 21/63; G01N 21/88; G01N 21/8851; G01N 21/71; G01N 25/72
See application file for complete search history.

(56) References Cited

U.S. PATENT DOCUMENTS 5,667,300 A 9/1997 Mandelis et al.
7,709,794 B2 * 5/2010 Zhao ..................... G01N 25/72
250/338.1
(Continued)

FOREIGN PATENT DOCUMENTS

CN 104422715 A 3/2015
CN 106932437 A 7/2017
(Continued)

OTHER PUBLICATIONS

Yun-Kyu An et al "Laser Lock-In Thermography For Fatigue Crack Detection", Key Engineering Materials vol. 558 (2013), pp. 76-83 (Year: 2013).*
(Continued)

*Primary Examiner* — Sang H Nguyen
(74) *Attorney, Agent, or Firm* — Marshall, Gerstein & Borun LLP

(57) ABSTRACT

Systems and methods for laser stimulated lock-in thermography (LLT) crack detection are provided. The system includes a spatial light modulator and a controller. The spatial light modulator reflects a laser beam to focus the laser beam onto a sample for detection of a crack, hole or scratch. The controller is coupled to the spatial light modulator and controls operation of the spatial light modulator to switch focus of the laser beam onto the sample between a plurality of LLT focus configurations for detection of the crack, hole or scratch on the sample. The method includes using a first one of the plurality of LLT configurations for coarse scanning of the sample to detect a crack, hole or scratch on the sample and, when a crack, hole or scratch is detected on the sample, switching to a second one of the plurality of LLT configurations for fine scanning of the crack, hole or scratch on the sample to determine one or more parameters of the crack, hole or scratch on the sample.

9 Claims, 8 Drawing Sheets

(51) Int. Cl.
*G01N 21/88* (2006.01)
*G01N 21/71* (2006.01)
*G01N 21/63* (2006.01)

(52) U.S. Cl.
CPC ......... *G01N 21/88* (2013.01); *G01N 21/8851* (2013.01)

(56) References Cited

U.S. PATENT DOCUMENTS

| | | | | |
|---|---|---|---|---|
| 9,500,599 | B2* | 11/2016 | Mun | G01J 5/0007 |
| 2015/0092814 | A1* | 4/2015 | Wolfgruber | G01N 25/72 |
| | | | | 374/121 |
| 2015/0155829 | A1* | 6/2015 | Stoicescu | G01N 21/66 |
| | | | | 324/761.01 |
| 2015/0204800 | A1 | 7/2015 | Mun et al. | |
| 2015/0226676 | A1 | 8/2015 | Nicolaides et al. | |
| 2015/0355118 | A1* | 12/2015 | Heissenstein | G01N 25/72 |
| | | | | 250/340 |
| 2016/0109393 | A1* | 4/2016 | Mandelis | G01N 29/343 |
| | | | | 73/606 |
| 2016/0245860 | A1* | 8/2016 | Schmidt | G01R 31/385 |
| 2017/0011495 | A1* | 1/2017 | Gaind | G01N 21/9501 |
| 2017/0023505 | A1* | 1/2017 | Maione | G01M 5/0033 |
| 2017/0176338 | A1* | 6/2017 | Wu | G01J 3/2823 |
| 2017/0343477 | A1* | 11/2017 | Santori | G01J 3/0229 |
| 2017/0357000 | A1* | 12/2017 | Bartlett | G01S 7/4817 |

FOREIGN PATENT DOCUMENTS

| | | |
|---|---|---|
| JP | 2018-044881 A | 3/2018 |
| KR | 101320358 B1 * | 10/2013 |

OTHER PUBLICATIONS

Search Report and Written Opinion in International Application No. PCT/SG2018/050159 dated Jun. 7, 2018, 10 pages.

* cited by examiner

RECONFIGURABLE LASER STIMULATED LOCK-IN THERMOGRAPHY FOR MICRO-CRACK DETECTION

PRIORITY CLAIM

This application claims priority from Singapore Patent Application No. 10201702564S filed on 29 Mar. 2017.

TECHNICAL FIELD

The present invention generally relates to active non-destructive testing, and more particularly relates to reconfigurable laser stimulated lock-in thermography for micro-crack detection.

BACKGROUND OF THE DISCLOSURE

Surface crack detection and sizing is an essential part of manufacturing and maintenance of engines, run parts, and other metal elements of aircrafts. While there are various detection methods, a fully non-contact, non-destructive and non-intrusive technique is most preferred. Vision-based techniques, such as light scattering techniques, are promising due to their non-contact nature, their simple operation mechanisms and their short inspection time requirements. However, surface contamination and/or scratches and variation of lighting conditions may often lead to false positives.

Recently, laser stimulated lock-in thermography (LLT) techniques have been demonstrated to utilize a single-spot laser source for heat generation and an infrared camera for crack inspection to minimize false positives. However, the laser spot must be positioned within the vicinity of the middle of the crack for accurate detection. The precision positioning needs to be controlled in sub-millimeter scale as the size of the laser spot is about one to two millimeters. If the laser spot overlaps the crack, the crack is invisible to the LLT. Also, the scanning area is typically limited to centimeter range depending on a field-of-view of the infrared camera and the heating area. These limitations make single-spot LLT techniques not suitable for real-time inspection of large surface areas due to the long scanning and processing time required.

Single-line LLT has been applied to instantaneous imaging of cracks in semiconductor chips. While single-line LLT can greatly reduce the scanning time required for semiconductor chip inspection, the single-line LLT risks covering a crack location thereby missing some cracks. To avoid this, the number of scanning steps is increased and, eventually, the time taken for such inspection is in the same range as the single-spot LLT method.

A multi-spot LLT system has recently been demonstrated for real-time inspection of semiconductor chips during the manufacturing process. In such systems, the multi-spots are generated by a predesigned diffractive optical element (DOE) which is specially designed in accordance with the material properties of the individual target. Since the DOE is a passive optical component which requires customized design, it greatly hinders the flexibility and adaptability of such systems.

Thus, what is needed is a surface crack detection and sizing system and method which is quick, scalable, flexible and adaptable for many materials and surfaces. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a system for laser stimulated lock-in thermography (LLT) crack detection is provided. The system includes a spatial light modulator and a controller. The spatial light modulator reflects a laser beam to focus the laser beam onto a sample for detection of a crack, hole or scratch. The controller is coupled to the spatial light modulator and controls operation of the spatial light modulator to switch focus of the laser beam onto the sample between a plurality of LLT focus configurations for detection of the crack, hole or scratch on the sample.

According to another aspect of the present embodiments, a method for laser stimulated lock-in thermography (LLT) crack detection is provided, the method provided in a system capable of switching between a plurality of LLT configurations on a sample. The method includes using a first one of the plurality of LLT configurations for coarse scanning of the sample to detect a crack, hole or scratch on the sample and, when a crack, hole or scratch is detected on the sample, switching to a second one of the plurality of LLT configurations for fine scanning of the crack, hole or scratch on the sample to determine one or more parameters of the crack, hole or scratch on the sample.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 4, comprising FIGS. 4A, 4B and 4C, depicts images of experimental results of crack detection on a metal sample in accordance with the present embodiment wherein FIG. 4A depicts a DC image, FIG. 4B depicts a lock-in amplitude image, and FIG. 4C depicts a processed binary image.

And FIG. 5, comprising FIGS. 5A to 5E, depicts images of a metal sample with micro-holes and cracks in accordance with the present embodiment wherein FIG. 5A depicts a photo image, FIG. 5B depicts a single-spot LLT amplitude image, FIG. 5C depicts a multi-spot LLT amplitude image, FIG. 5D depicts a Sobel kernel processed image of the image of FIG. 5B and FIG. 5E depicts a Sobel kernel processed image of the image of FIG. 5C.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present a system of reconfigurable laser stimulated lock-in thermography (LLT) for three-dimensional surface crack detection in metal and composite materials. In accordance with present embodiments, not only are cracks quickly located but also the systems and methods accurately measure the crack's dimension. The method further reduces the overall scanning time, saving the need for repeated optical alignment when changing samples and optics, thereby lowering the error rate, increasing the signal to noise ratio and providing three-dimensional crack information for any individual crack. The method and systems in accordance with the present embodiments can be equally applied to non-destructive detection of surfaces or hidden defects in semiconductors and integrated circuits.

Figure 1:
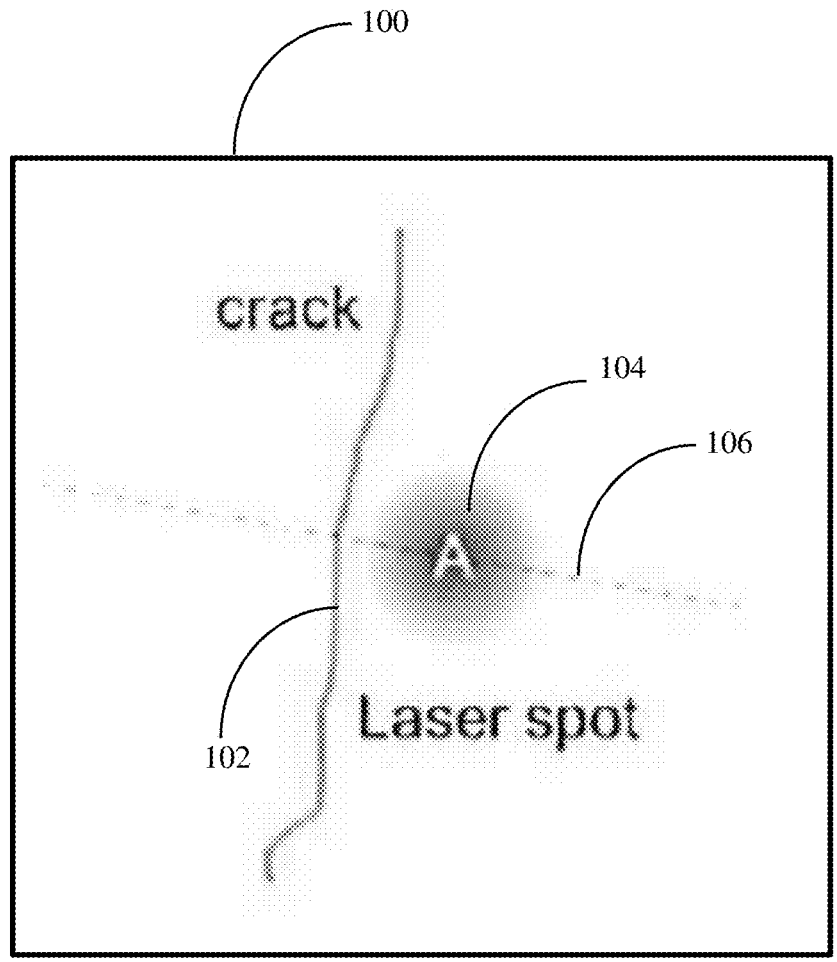
FIG. 1 depicts an illustration of conventional single-spot laser lock-in thermography (LLT).

Referring to FIG. 1, an illustration 100 depicts an open crack 102 with a laser spot 104 in its vicinity for conventional laser lock-in thermography (LLT) utilizing the single-spot laser 104 for heat generation and an infrared camera (not shown) for crack inspection. The laser spot 104 must be positioned at the vicinity of the middle of the crack 102 for accurate detection. The diameter of the laser spot 104 is chosen to confine $1/e^2$ of the laser intensity for the heat generation. The dashed line 106 is a guide-of-eyes field-of-view of the IR camera and the crack would be invisible in LLT when the laser spot 104 overlaps the crack 102. Thus, the single-spot LLT technique shown in the illustration 100 is not suitable for real-time inspection of large surface area due to its long scanning and processing time.

Figure 2:
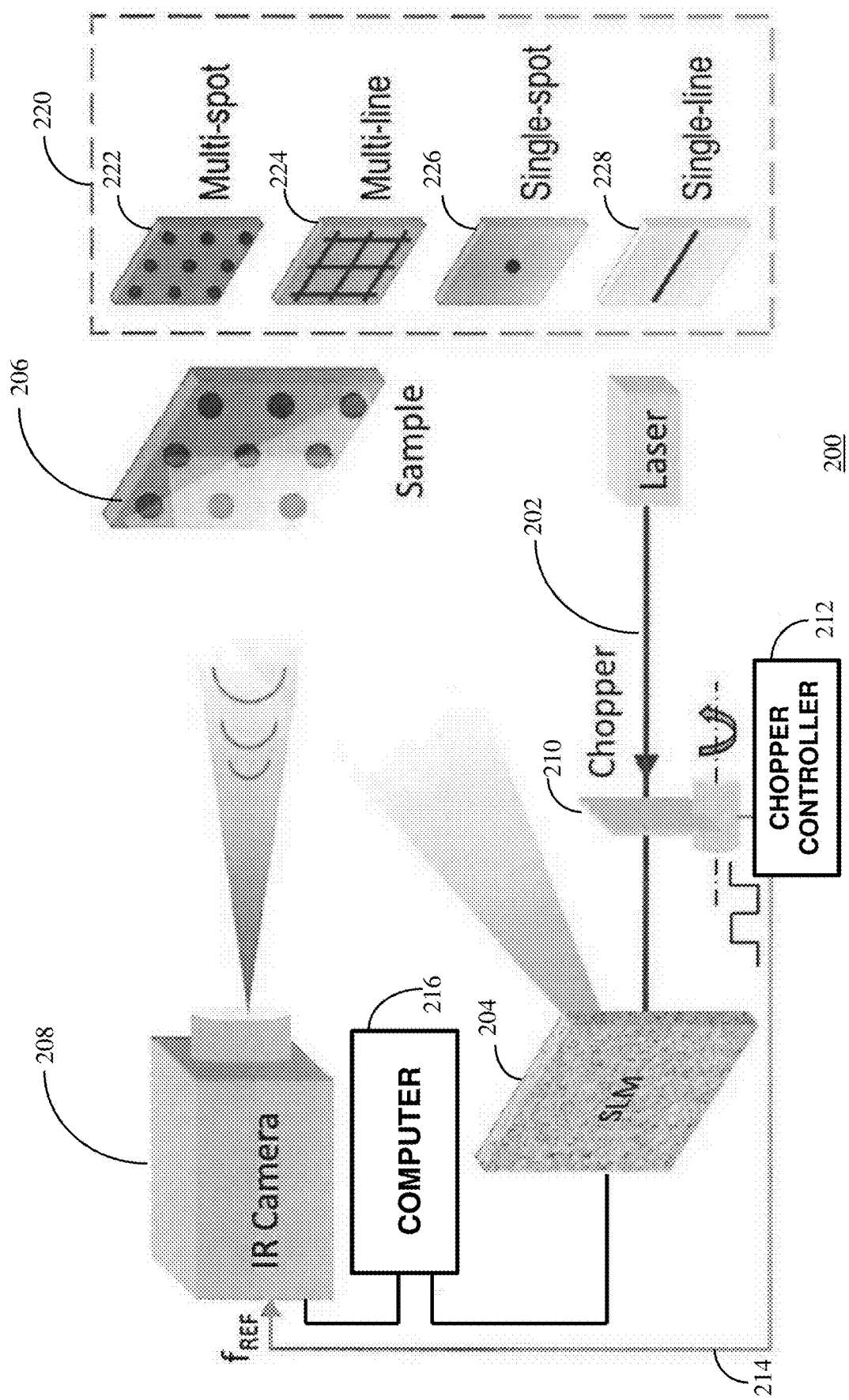
FIG. 2 depicts an illustration of a reconfigurable laser stimulated lock-in thermography (LLT) system in accordance with a present embodiment.

Referring to FIG. 2, an illustration 200 depicts a system for reconfigurable LLT for three-dimensional surface crack detection in accordance with a present embodiment. An amplitude modulated laser beam 202 is reflected by a spatial light modulator (SLM) 204 and incident on a sample 206. A lock-in infrared (IR) signal incident on the sample is recorded by an IR camera 208. The laser beam 202 is modulated by a chopper 210 which is controlled by a chopper controller 212. The laser beam 202 is then reflected by the SLM 204 onto the sample 206, the incident laser beam being modulated at the frequency of the chopper 210 modulation. The chopper controller 212 is coupled to the IR camera 208 to provide the modulation frequency 214 thereto so that the IR camera 208 works in the lock-in mode and records the lock-in amplitude and phase images of the incidence of the laser beam on the sample 206. A computer 216 is coupled to the IR camera 208 to store the media recorded by the IR camera 208. The computer 216 is also coupled to the SLM 204 to switch focus of the laser beam on the sample 206 between four configurations 220: a multi-spot LLT configuration 222, a multi-line LLT configuration 224, a single-spot LLT configuration 226, and a single-line LLT configuration 228. Switching among the four configurations 220 is realized by the SLM 204 incorporating an electrically tuned diffractive optical element (DOE) to control divergence angle and spot size or line width for multi-spot or multi-line configurations.

Figure 3:
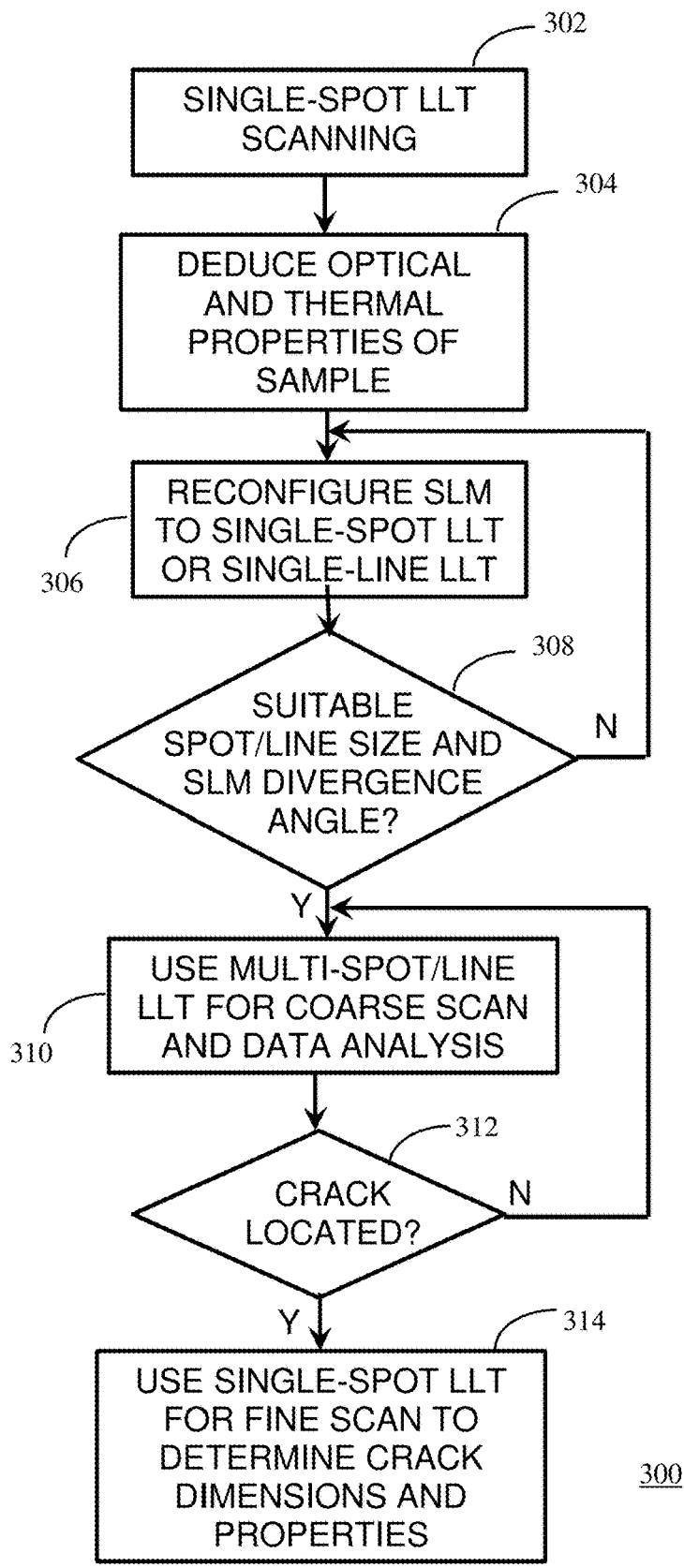
FIG. 3 depicts a flowchart of a method for operation of the LLT system of FIG. 2 in accordance with the present embodiment.

Referring to FIG. 3, a flowchart 300 depicts operation of the LLT system of the illustration 200. The reconfigurable multi-spot/line 222, 224 is used in accordance with the present embodiment to obtain a large area overview of crack distribution within a short time. In addition, the reconfigurable single-spot/line 226, 228 is used for fine scan to obtain detailed three-dimensional information of an open surface crack, including precise length, width, and depth, with arbitrary orientation. The length, width, and depth parameters are heavily dependent on the optical and thermal properties of the target material and can be obtained from the single-spot 226 laser beam scanning. Accordingly, the method for operation of the LLT system to detect surface cracks and in metal and composite materials begins by the computer 216 signalling the SLM 204 to begin single-spot laser beam scanning 302. The computer 216 will deduce 304 the optical and thermal properties of the sample 206 from the signal from the IR camera 208. The tunability of the DOE of the SLM 204 enables the system to adapt to any material under investigation.

Figure 4A:
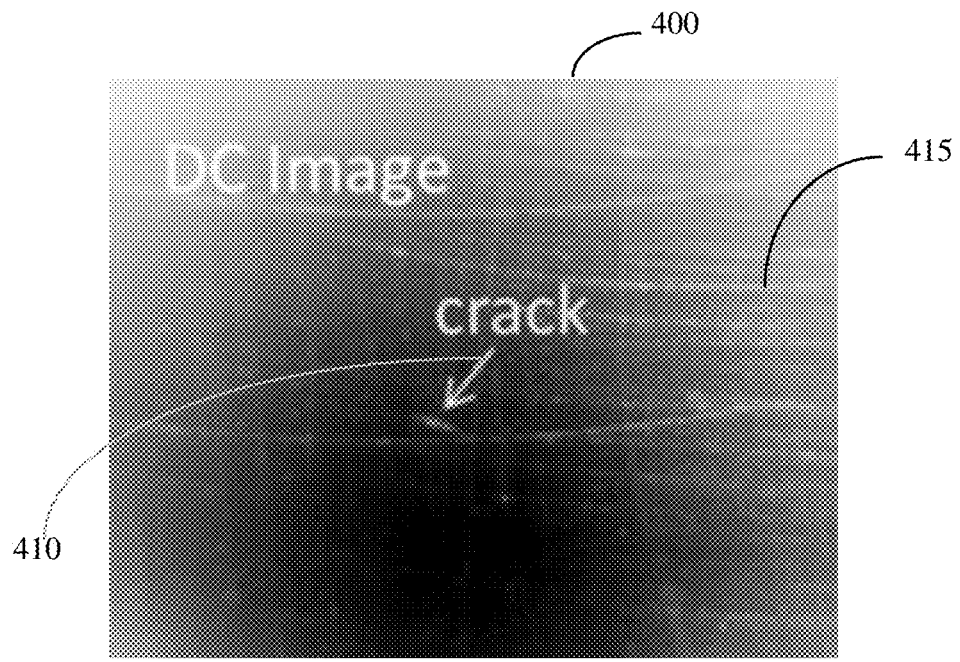
Figure 4B:
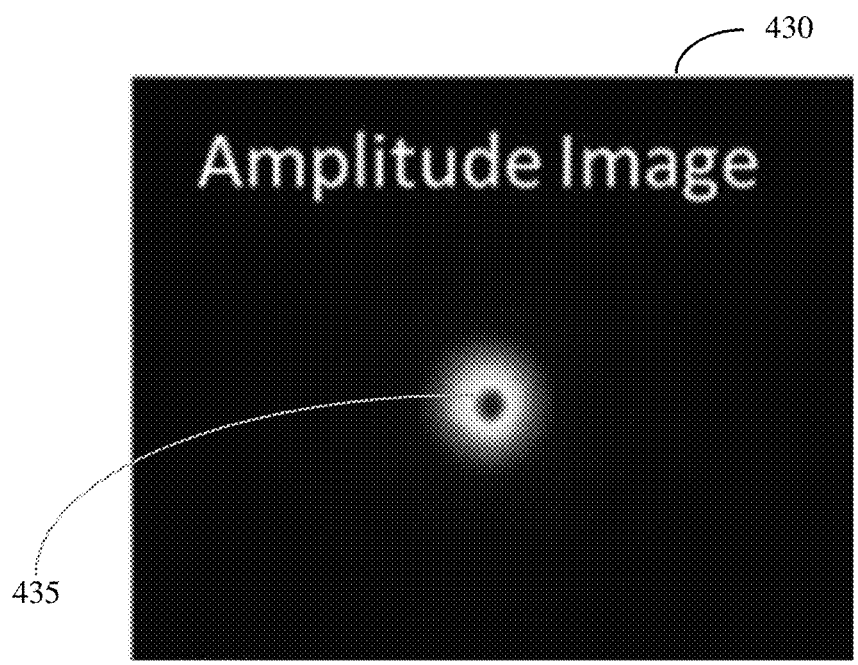
Figure 4C:
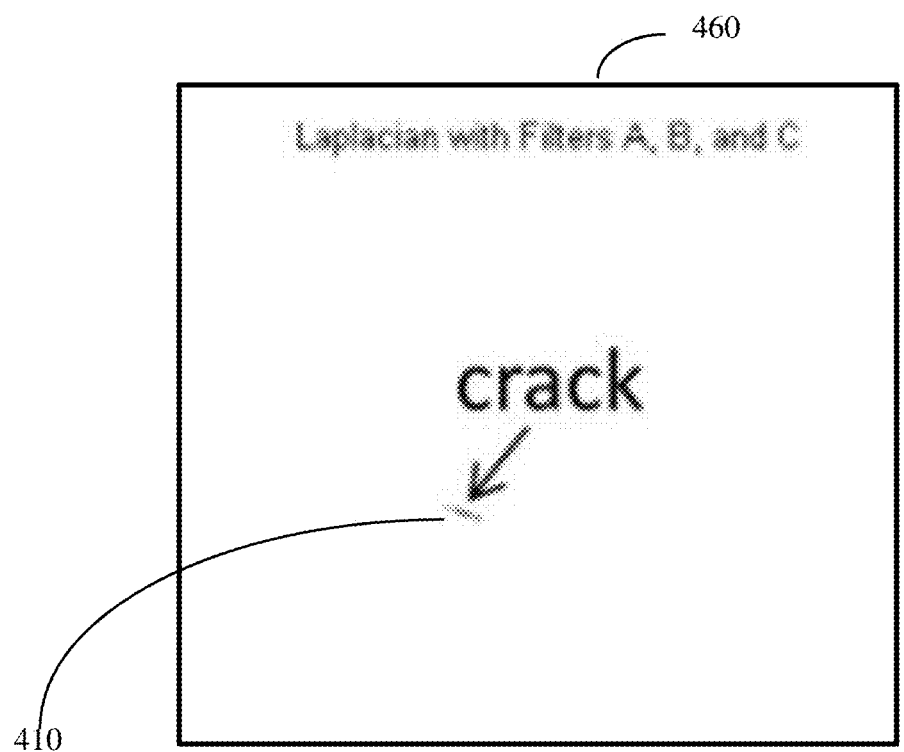
Figure 5A:
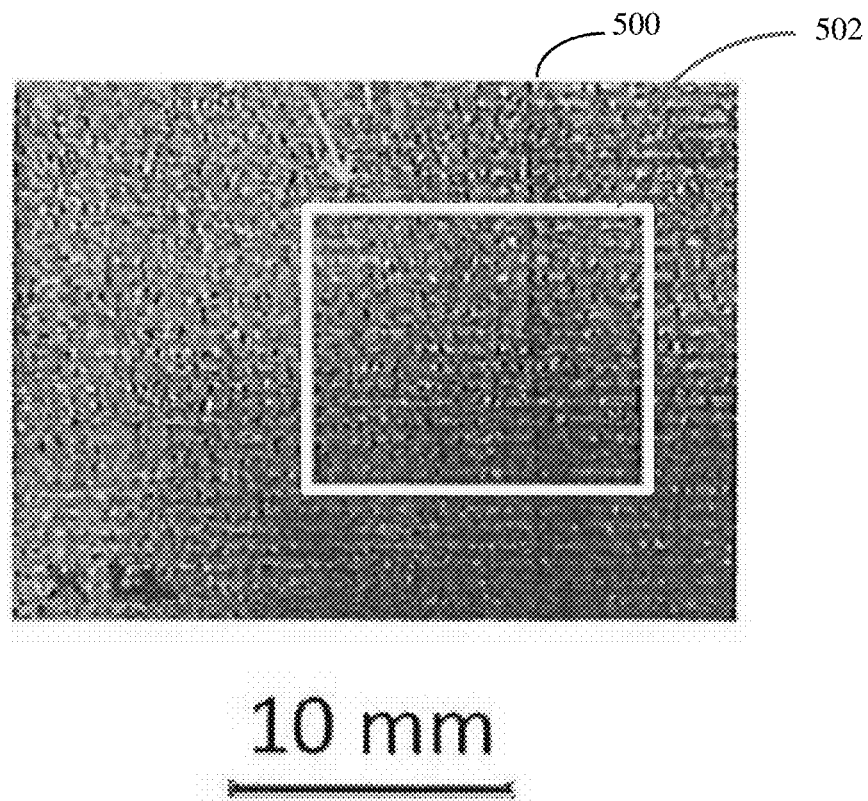
Figure 5B:
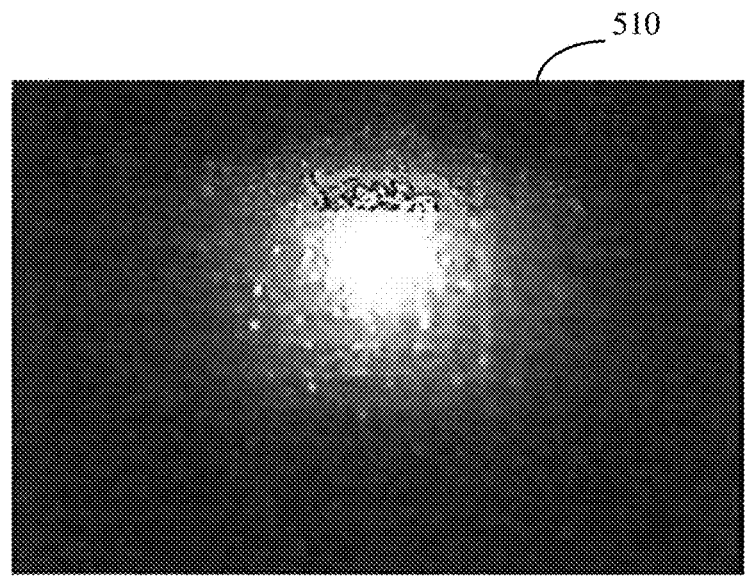
Figure 5C:
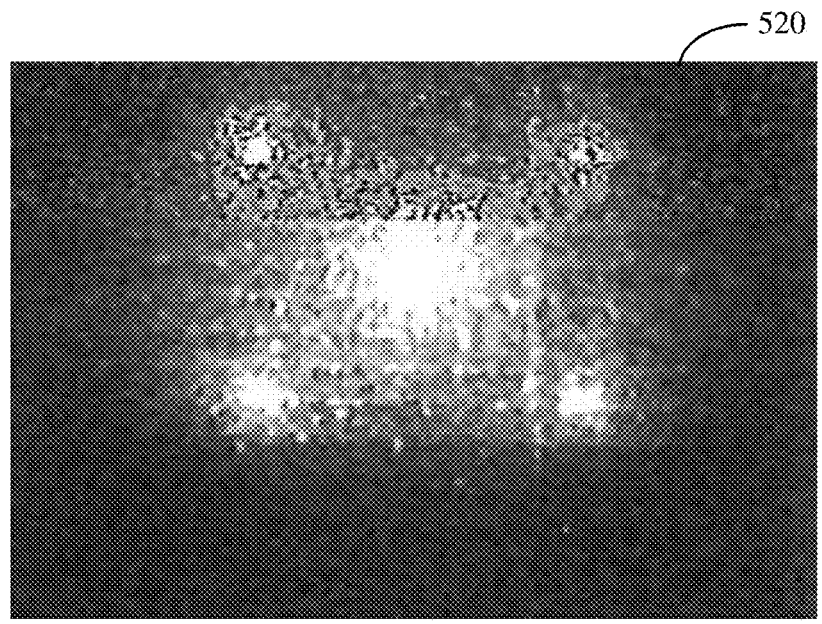
Figure 5D:
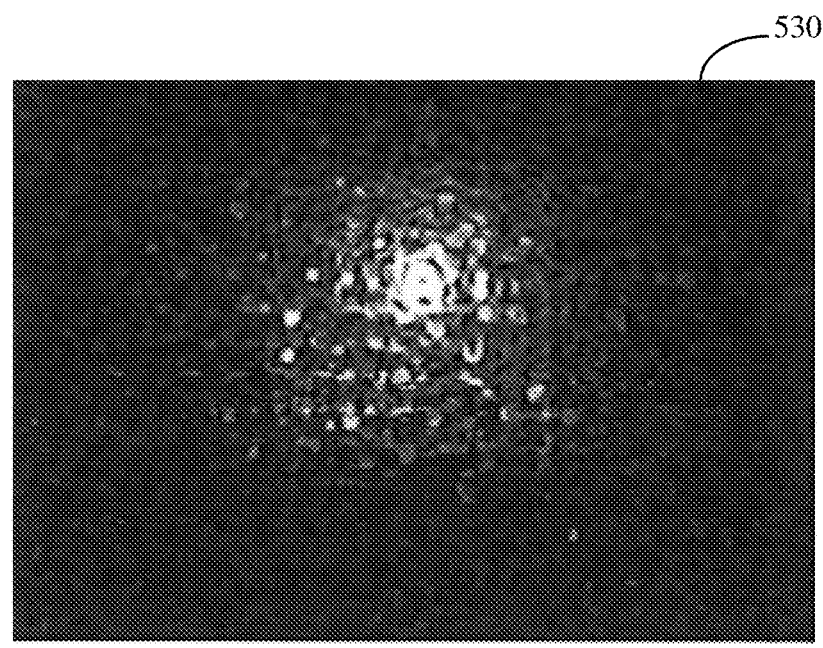
Figure 5E:
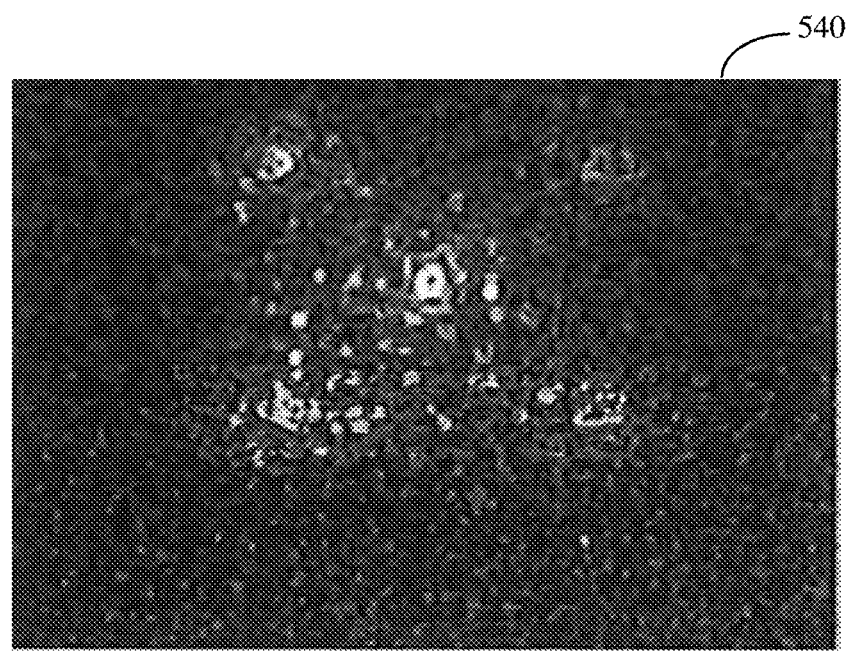

Next, the method in accordance with the present embodiment includes the computer 216 signalling the SLM 204 to reconfigure 306 the SLM 204 to single-spot 226 or single-line 228 LLT to scan the sample 206 to determine 308 in response to the IR camera signal a suitable spot size or line width and a suitable divergence angle of the SLM 204. This tunability of the DOE of the SLM 204 enables the system to optimize investigation of the sample 206. Once the spot/line and optimal divergence angle have been determined 308, the computer 216 signals the SLM 204 to use 310 multi-spot 222 or multi-line 224 LLT scanning for coarse scan and data analysis. Once a crack has been located 312, the single-spot 226 LLT will be applied 314 on the crack for a fine scan to determine the crack dimensions and properties. Thus, it can be seen that the tunability of the DOE of the SLM 204 in accordance with the present embodiment not only enables fast location and detection of cracks but also allows accurate measurement of the crack's dimensions and properties. The method in accordance with present embodiment further reduces the overall scanning time, saving the need for repeated optical alignment when changing samples and optics, thereby lowering the error rate, increasing the signal to noise ratio and providing three-dimensional crack information for any individual crack Referring to FIGS. 4A, 4B and 4C, images 400, 430, 460 depict experimental results for single-spot LLT detection of an open crack 410 on metal having a crack length 1.7 mm and a crack opening 2.0 µm. In a steady state image 400, not only the crack 410 but also surface scratches 415 are captured. In a lock-in amplitude image 430, the crack 410 blocks thermal diffusion of a heat wave 435 and results in inhomogeneous thermal diffusion. The crack 410 is then clearly shown in a processed binary image 460. By varying the modulation frequency, the thermal diffusion length of the heat wave 435 can be changed. Thus, using a modulated excitation associated to lock-in thermography in accordance with the present embodiment, the excitation frequency offers a means to change a size of the modulated heat wave 435 diffusion region. Depth of the crack 410 can then be calculated through a full frequency scan by comparing with the scan with a numerical simulation. A full frequency scan in metal typically takes about ten minutes. For such single-spot 226 laser scan, the inspection area is a few millimeters. A 4×4 array of laser spots (i.e., the multi-spot 222 laser scan) is able to cover a 20×20 mm area to speed up the inspection by sixteen times.

Referring to FIGS. 5A to 5E, images 500, 510, 520, 530, 540 depict images of a metal sample with micro-holes and cracks. The image 500 is a photo image depicting an LLT inspection area 502 containing micro-holes and cracks. The diameter of micro-holes varies from 10-100 µm. The image 510 is a single-spot LLT amplitude image and the image 520 is a multi-spot LLT amplitude image. As compared to the single-spot LLT in the image 510, the multi-spot LLT in the image 520 covers a larger area and inspects more surface defects. The minimum resolved size of micro-holes is about 50 µm and the lowest temperature sensitivity is about 10 mK. The images 530 and 540 are post-processed images of the images 510 and 520, respectively, by Sobel operator image processing. It can be seen that the defects are better identified in the images 530, 540 than in the images 510, 520.

Thus, it can be seen that the present embodiments provide methods and systems for crack detection and investigation suitable for metal or composite materials. The methods and systems in accordance with the present embodiments greatly reduce overall scanning time and additionally saves time from repeated optical alignment when changing samples and the diffractive optical element. The method and systems in accordance with the present embodiments also reduce the error rate, increase the signal to noise ratio and provide three-dimensional information of individual cracks. The method and systems in accordance with the present embodiments can be applied to non-destructive surface or hidden defect detection in semiconductor and integrated circuit industry as well as inspecting metal and composite material aircraft parts. In addition, the lock-in thermography can produce an amplitude image which is sensitive to surface defects and a phase image which is more effective to detect subsurface defects.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A laser stimulated lock-in thermography (LLT) crack detection system comprising:
   a spatial light modulator for reflecting a laser beam to focus the laser beam onto a sample for detection of a crack, hole, or scratch; and
   a controller coupled to the spatial light modulator and configured to control operation of the spatial light modulator to switch focus of the laser beam onto the sample between a plurality of LLT laser beam focus configurations for detection of the crack, hole, or scratch on the sample, wherein the plurality of LLT laser beam focus configurations comprise a plurality of spot LLT laser beam focus configurations and at least one line LLT laser beam focus configuration, wherein the spatial light modulator comprises an electrically tuned diffractive optical element to control divergence angle and spot size or line width for focus of the laser beam onto the sample between the plurality of LLT laser beam focus configurations.

2. The system in accordance with claim 1 wherein the plurality of spot LLT laser beam focus configurations comprise at least a single-spot LLT laser beam focus configuration and a multi-spot LLT laser beam focus configuration.

3. The system in accordance with claim 1 wherein the at least one LLT laser beam focus configuration comprises at least a single-line LLT laser beam focus configuration and a multi-line LLT laser beam focus configuration.

4. The system in accordance with claim 1 further comprising an infrared camera for recording an incidence of the laser beam on the sample to identify the crack, hole or scratch on the sample.

5. The system in accordance with claim 4 further comprising a chopper in the path of the laser beam wherein the infrared camera and the chopper are coupled to the controller for synchronizing chopping of the laser beam with recording of the laser beam incidence on the sample.

6. The system in accordance with claim 1 wherein the sample comprises a metal sample or a composite material sample.

7. The system in accordance with claim 1 wherein the controller is configured to further switch focus of the laser beam onto the sample between the plurality of LLT laser beam focus configurations for determination of at least one parameter of the crack, hole, or scratch on the sample.

8. The system in accordance with claim 7 wherein the at least one parameter of the crack, hole, or scratch on the sample comprises at least one dimension or property of the crack, hole, or scratch on the sample.

9. The system in accordance with claim 8 wherein the at least one dimension of the crack, hole, or scratch on the sample comprises a length, width, or depth of the crack, hole, or scratch with arbitrary orientation on the sample.

* * * * *